US009256286B2

(12) United States Patent
Mohammed et al.

(10) Patent No.: US 9,256,286 B2
(45) Date of Patent: *Feb. 9, 2016

(54) HAPTIC ACCESSORY AND METHODS FOR USING SAME

(71) Applicant: International Business Machines Corporation, Armonk, NY (US)

(72) Inventors: Siddique Mohammed, Bangalore (IN); David Nahamoo, Great Neck, NY (US); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/864,666

(22) Filed: Apr. 17, 2013

(65) Prior Publication Data

US 2014/0167938 A1 Jun. 19, 2014

Related U.S. Application Data

(60) Provisional application No. 61/738,005, filed on Dec. 17, 2012.

(51) Int. Cl.
*H04B 3/36* (2006.01)
*G06F 3/01* (2006.01)

(52) U.S. Cl.
CPC .......................... *G06F 3/016* (2013.01)

(58) Field of Classification Search
CPC .......................................................... G06F 3/16
USPC ..................... 340/407.1, 815.4; 345/173–178
See application file for complete search history.

(56) References Cited

U.S. PATENT DOCUMENTS

| 5,165,897 | A | 11/1992 | Johnson |
| 5,574,576 | A | 11/1996 | Martin |
| 5,984,880 | A | 11/1999 | Lander et al. |
| 6,402,620 | B1 * | 6/2002 | Naghi ............................. 463/47 |
| 6,424,333 | B1 | 7/2002 | Tremblay et al. |
| 7,046,151 | B2 | 5/2006 | Dundon |

(Continued)

FOREIGN PATENT DOCUMENTS

| EP | 1521434 A1 | 4/2005 |
| JP | 10-287189 | 10/1998 |

(Continued)

OTHER PUBLICATIONS

PCT International Search Report and Written Opinion, dated Apr. 23, 2014, for PCT Application PCT/US2013/064767.

(Continued)

*Primary Examiner* — Fekadeselassie Girma
*Assistant Examiner* — Son M Tang
(74) *Attorney, Agent, or Firm* — Nidhi Garg; Ryan, Mason & Lewis, LLP

(57) ABSTRACT

A method for providing tactile feedback comprises displaying a visual representation of a physical object having at least one haptic property, generating time-varying data associated with the at least one haptic property from the visual representation, sending the time-varying data to a computing device including a feedback apparatus electrically connected to the computing device, and generating the tactile feedback via the feedback apparatus in response to a pressure on the feedback apparatus applied by a user.

15 Claims, 6 Drawing Sheets

(56) References Cited

U.S. PATENT DOCUMENTS

| | | | |
|---|---|---|---|
| 7,227,968 | B2 | 6/2007 | van Halteren et al. |
| 7,562,816 | B2 | 7/2009 | Abraham et al. |
| 7,723,896 | B2 | 5/2010 | Esashi et al. |
| 8,040,345 | B2 | 10/2011 | Faken et al. |
| 8,159,461 | B2 | 4/2012 | Martin et al. |
| 8,174,372 | B2 | 5/2012 | da Costa |
| 8,201,850 | B2 | 6/2012 | Browne et al. |
| 8,207,832 | B2 * | 6/2012 | Yun et al. .................. 340/407.2 |
| 8,244,211 | B2 | 8/2012 | Clark |
| 8,253,703 | B2 * | 8/2012 | Eldering ..................... 345/173 |
| 8,264,465 | B2 | 9/2012 | Grant et al. |
| 8,274,376 | B2 | 9/2012 | Shields et al. |
| 8,369,887 | B2 * | 2/2013 | Choe et al. .................. 455/550.1 |
| 8,427,433 | B2 * | 4/2013 | Edwards et al. ............. 345/173 |
| 8,866,600 | B2 * | 10/2014 | Yang et al. ................. 340/407.1 |
| 2002/0046020 | A1 | 4/2002 | Ishibashi et al. ............. 704/201 |
| 2002/0094755 | A1 | 7/2002 | Amineh |
| 2002/0158836 | A1 * | 10/2002 | Ishmael et al. ............... 345/156 |
| 2002/0191011 | A1 * | 12/2002 | Rasouli ................... G06F 3/016 715/702 |
| 2005/0097179 | A1 | 5/2005 | Ore |
| 2005/0275567 | A1 * | 12/2005 | DePue et al. .................. 341/32 |
| 2006/0274036 | A1 * | 12/2006 | Hioki et al. .................. 345/156 |
| 2008/0274769 | A1 | 11/2008 | Linden |
| 2008/0303782 | A1 * | 12/2008 | Grant et al. ................... 345/156 |
| 2009/0251421 | A1 * | 10/2009 | Bloebaum ............... G06F 3/016 345/173 |
| 2010/0073328 | A1 | 3/2010 | Lynch et al. |
| 2010/0141407 | A1 | 6/2010 | Heubel et al. |
| 2010/0149092 | A1 | 6/2010 | Westerman et al. |
| 2010/0231508 | A1 * | 9/2010 | Cruz-Hernandez ... G06F 3/0488 345/156 |
| 2010/0231541 | A1 * | 9/2010 | Cruz-Hernandez ... G06F 3/0488 345/173 |
| 2010/0311489 | A1 * | 12/2010 | Miller et al. ..................... 463/16 |
| 2010/0311490 | A1 * | 12/2010 | Miller et al. ..................... 463/16 |
| 2011/0001616 | A1 | 1/2011 | Nathan et al. |
| 2011/0074702 | A1 * | 3/2011 | Pertuit .................... G06F 3/041 345/173 |
| 2011/0152729 | A1 | 6/2011 | Oohashi et al. |
| 2011/0254671 | A1 * | 10/2011 | Okimoto et al. ........... 340/407.1 |
| 2012/0028577 | A1 | 2/2012 | Rodriguez et al. |
| 2012/0162117 | A1 | 6/2012 | Wilson et al. |
| 2012/0206248 | A1 * | 8/2012 | Biggs ......................... 340/407.2 |
| 2012/0218091 | A1 | 8/2012 | Rothschild |
| 2012/0220311 | A1 | 8/2012 | Rodriguez et al. |
| 2012/0237043 | A1 | 9/2012 | Radivojevic et al. |
| 2012/0242687 | A1 | 9/2012 | Choi |
| 2013/0100046 | A1 * | 4/2013 | Chuang et al. ................ 345/173 |
| 2013/0127735 | A1 * | 5/2013 | Motoyama .......... G06F 3/04886 345/173 |
| 2013/0201115 | A1 * | 8/2013 | Heubel ......................... 345/173 |
| 2013/0201141 | A1 | 8/2013 | Birnbaum et al. |
| 2013/0335354 | A1 * | 12/2013 | Zellers et al. ................. 345/173 |
| 2014/0002376 | A1 * | 1/2014 | Oliver et al. .................. 345/173 |
| 2014/0168114 | A1 * | 6/2014 | Mohammed et al. ......... 345/173 |

FOREIGN PATENT DOCUMENTS

| | | |
|---|---|---|
| JP | 2002232317 A | 8/2002 |
| WO | 03/014907 A1 | 2/2003 |

OTHER PUBLICATIONS

PCT International Search Report and Written Opinion, dated May 23, 2014, for counterpart PCT Application PCT/US2013/061658.

K. Nakajima et al., "FuSA2 Touch Display," ACM SIGGRAPH Emerging Technologies, Jul. 2010, 1 page.

Senseg, "Senseg is Haptics Re-Imagined and Realized," http://senseg.com/technology/senseg-tecnology, Mar. 2013, 2 pages.

Hunter Sebresos, "Mobile Hapticons," Texture/Touch/Meaning, http://www.concepthunter.com/touch/hapticons.html, Mar. 2013, 2 pages.

Wikipedia, "Haptic Technology," http://www.en.wikipedia.org/wiki/Haptic_technology, Mar. 2013, 8 pages.

* cited by examiner

600

HAPTIC ACCESSORY AND METHODS FOR USING SAME

CROSS-REFERENCE TO RELATED APPLICATION

This application claims the benefit of U.S. Provisional Patent Application Ser. No. 61/738,005, filed on Dec. 17, 2012, the contents of which are herein incorporated by reference in their entirety.

TECHNICAL FIELD

The field generally relates to a haptic accessory and, in particular, a haptic accessory for a computer device and methods for using same.

BACKGROUND

Online and mobile commerce has been increasing at a rapid pace from year to year, especially with the increasing adoption of mobile devices, such as, for example, smartphones and tablets. Using, for example, mobile phone or tablet applications, mobile web sites, or a combination thereof, shoppers are able to use online stores or shopping sites to search for, compare, examine, and purchase items using their mobile devices.

Using mobile devices to purchase goods permits a consumer to make purchase decisions at any time and any place, at his or her convenience. However, shopping online or with a mobile device also prevents a consumer from examining an article or physical object in person, not allowing the consumer to touch, feel, or try using the product, all of which can presently only be done in a store or similar physical setting where both the product and purchaser are present.

In addition, when practicing remote or tele-medicine, a doctor remains unable to feel a wound without being co-located with a patient.

Some of the restrictions of mobile and online commerce, or remote medicine have been addressed. For example, high-resolution, full-color displays on higher end devices, and increasingly on mid- and lower-level devices, make it possible to present very realistic images of an item or medical condition. Audio makes it possible to hear an object (for example, an engine or a musical instrument), or to hear a sales associate explaining an item. In addition, video makes it possible to see an item in action, or being used.

Haptic technology, or haptics, permits a user to receive tactile feedback to some degree through a device by applying forces, vibrations, and/or motions to the user. However, with current technology, the mobile and online consumer, or remote doctor still remains unable to accurately feel or simulate the feeling of touching a wound, scar, or a desired product, such as an article of clothing, when making a purchase.

SUMMARY

In general, exemplary embodiments of the invention include a haptic accessory and, in particular, a haptic accessory for a computer device and methods for using same.

According to an exemplary embodiment of the present invention, an apparatus for providing tactile feedback comprises an actuator, wherein the actuator is capable of generating a vibration pattern based on a received variable frequency, a plurality of fibers on the actuator, and a membrane on the plurality of fibers.

According to an exemplary embodiment of the present invention, a method for providing tactile feedback comprises displaying a visual representation of a physical object having at least one haptic property, generating time-varying data associated with the at least one haptic property from the visual representation, sending the time-varying data to a computing device including a feedback apparatus electrically connected to the computing device, and generating the tactile feedback via the feedback apparatus in response to a pressure on the feedback apparatus applied by a user.

According to an exemplary embodiment of the present invention, an article of manufacture comprises a computer readable storage medium comprising program code tangibly embodied thereon, which when executed by a computer, performs method steps for providing tactile feedback, the method steps comprising displaying a visual representation of a physical object having at least one haptic property, generating time-varying data associated with the at least one haptic property from the visual representation, sending the time-varying data to a computing device including a feedback apparatus electrically connected to the computing device, and generating the tactile feedback via the feedback apparatus in response to a pressure on the feedback apparatus applied by a user.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to a haptic accessory and, in particular, a haptic accessory for a computer device and methods for using same. This invention may, however, be embodied in many different forms and should not be construed as limited to the embodiments set forth herein.

The embodiments of the present invention describe devices, systems and methods through which computers and mobile devices, such as, for example, smartphones and tablets, can be improved to transmit realistic haptic feelings to users. While some of the embodiments of the present invention are described in connection with mobile devices and commerce, the embodiments of the invention are not necessarily limited thereto. For example, the haptic accessory discussed herein can be applied to other types of computing devices, such as, for example, desktop and laptop computers, and personal digital assistants (PDAs), and can be applied to other fields, such as, for example, the medical field. In the case of the medical field, a doctor located remotely from a patient may be able to use the devices, systems and methods of the embodiments of the present invention to examine patients and simulate feeling of patients' wounds or scars while not being physically present with the patient. It is to be understood that embodiments of the present invention are not limited to the retail and healthcare fields.

Figure 1A:
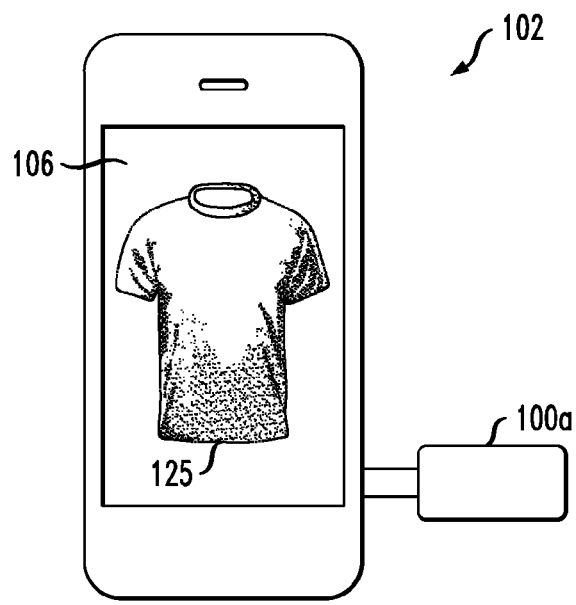
FIGS. 1A and 1B illustrate devices for providing tactile feedback according to exemplary embodiments of the invention.
Figure 1B:
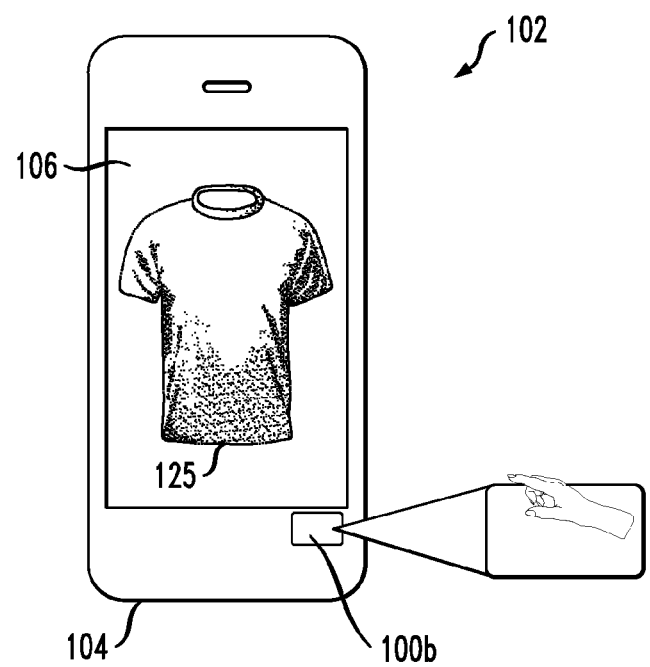

Referring, for example, to FIGS. 1A and 1B, in accordance with embodiments of the present invention, an accessory 100a, 100b for a mobile device 102, such as a smartphone can be embedded in and integral with a body 104 of the mobile device as shown in FIG. 1B, or, as shown in FIG. 1A, selectively attachable to the mobile device 102 as a dongle via, for example, a port, such as a universal serial bus (USB) port. According to another embodiment, the accessory can be embedded into the electronic visual display 106 of the mobile device 102.

Figure 2:
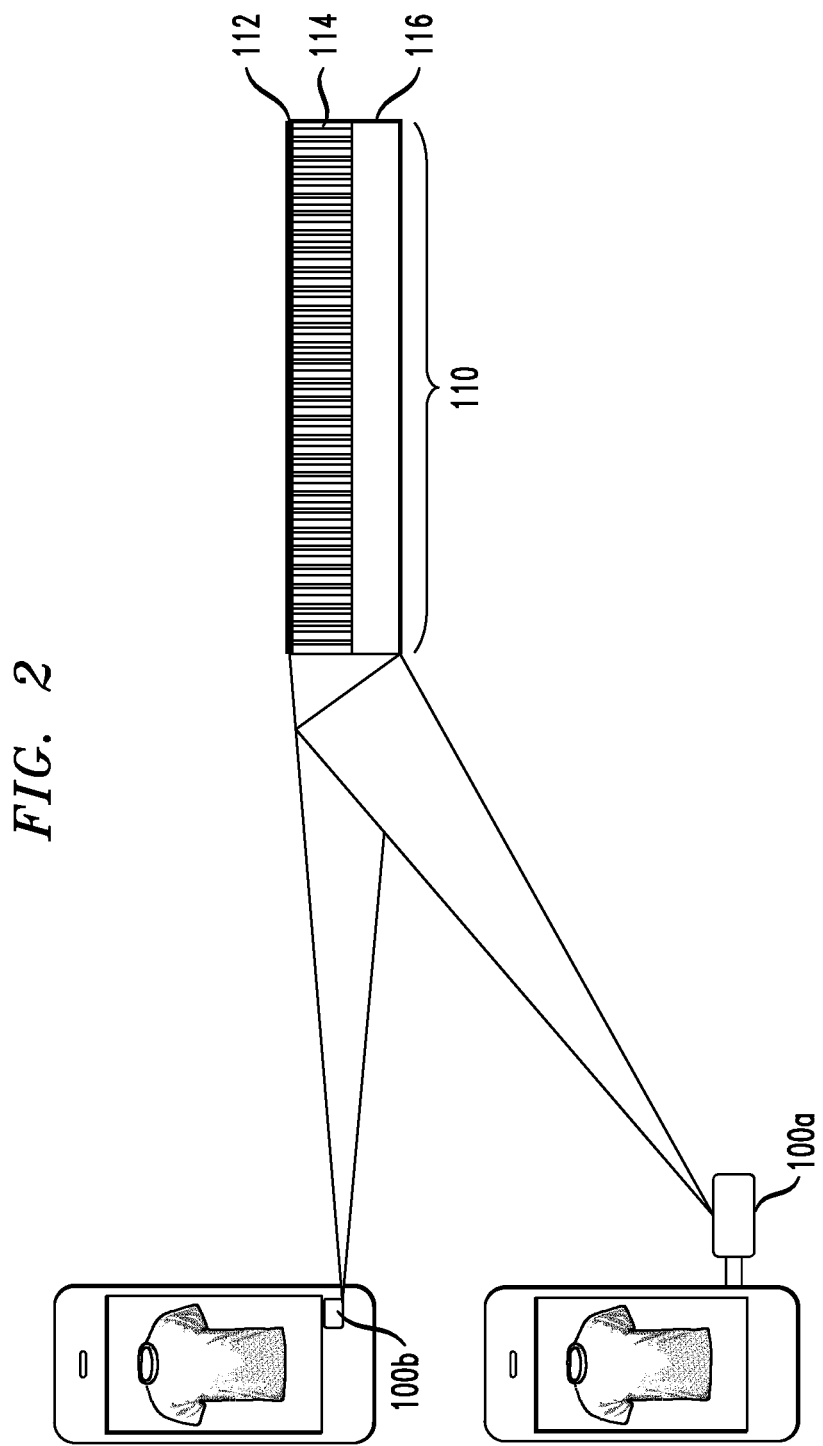
FIGS. 2-4 are cross-sectional views illustrating a structure of devices for providing tactile feedback according to exemplary embodiments of the invention.

Referring to FIG. 2, the accessory 100a, 100b can be constructed in a mattress-like configuration 110 including a malleable material/membrane 112 positioned on a plurality of hair-like fibers 114 whose properties, such as stiffness, temperature, etc., can be controlled using one or more actuators 116 receiving variable frequency patterns. The variable frequency patterns are controlled based on, for example, an intended flexibility, texture, temperature, etc. of the fibers 114. This mattress-like structure functions to permit a realistic haptic feeling of various real world objects.

In accordance with embodiments of the present invention, the accessory 100a, 100b includes human hair sized or approximately human hair sized synthetic fibers 114. While not necessarily limited thereto, the synthetic fibers 114 can include, for example, nylon, acrylic, polyester, etc. The accessory can be, for example, a pluggable dongle 100a, a portion 100b of a mobile device 102, or other computer device, or the whole or a part of the visual display 106.

Figure 5:
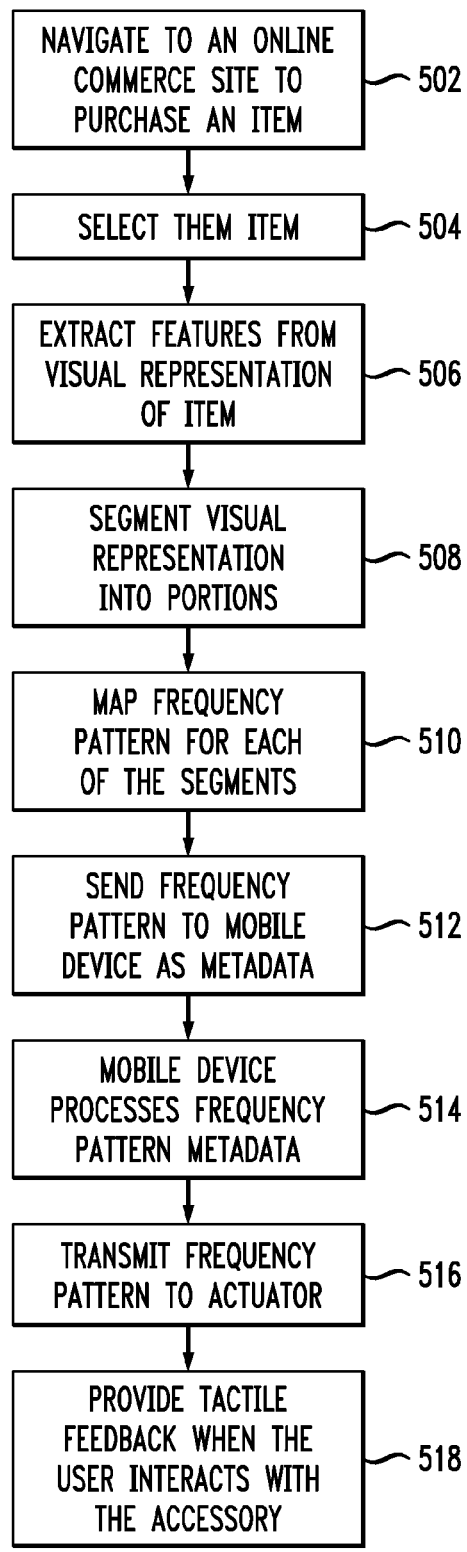
FIG. 5 is a flow chart illustrating a method for providing tactile feedback according to an exemplary embodiment of the invention.

Referring to FIG. 5, which illustrates a method for providing tactile feedback to a user, according to an embodiment of the present invention, in an example of the operation of the mobile device 102 including the accessory 100a or 100b, a customer/mobile subscriber navigates to an online commerce site to purchase an item, e.g., shirt 125 (block 502). After browsing an online catalog, the customer selects the item, e.g., shirt 125, for further viewing and information (block 504). The selection may yield a visual representation of the product, which can include and image and/or video that is displayed for the user. As an alternative, an individual may be in a store, or next to a patient to be examined, take a picture of a product in the store, or a part of the body of the patient to be examined using a camera, for example, on a mobile device, and send the taken picture to a user in the place of the customer/mobile subscriber described above.

Online commerce sites may allow a customer to click on details of an item to receive further information about the product. For example, in the case of an apparel item, a customer may receive the following data: size, color, availability, price, store location, picture of the item, shipping time, etc., which is sent to the mobile or other computing device as metadata. In accordance with embodiments of the present invention, one or more features of the product (e.g., texture, temperature, softness/hardness, stiffness, moisture content, swelling, color, size, etc.) are extracted from a visual representation of the product using, for example, digital image processing (DIP), digital image capture (DIC) and/or magnetic resonance imaging (MRI) techniques (block 506). The visual representation (e.g. image) is physically segmented into portions (block 508), and based on the extracted features, a frequency pattern is mapped corresponding to each of the segments (block 510), which can vary based on the differences between the extracted features at each segment. The frequency pattern is sent to the mobile or other computing device as metadata (block 512). According to an embodiment of the present invention, the extracted features and segmentation result in time-varying data values (e.g. in the form of a varying frequency pattern) associated with each physical haptic property of the product. The frequency pattern metadata is not visible to the user of the mobile or other computing device, but is processed by the mobile or other computing device (block 514), through, for example, an application, and transmitted to the actuator 116 (block 516) to provide the necessary tactile feedback when the user interacts with the accessory 100a or 100b (block 518). According to an embodiment, the membrane 112 of the accessory 100a, 100b responds to pressure applied thereto by, for example, the finger of a user. The pattern and amount of tactile feedback is a time-varying function of the time-varying data such that the pattern and amount of tactile feedback can be sufficient to identify the physical object. For example, the tactile feedback may have a multi-dimensional time varying pattern of vibration, such as, for example, a two-dimensional time-varying pattern of vibration generated by the actuator 116, and may include, for example, temperature and stiffness. The actuator 116 converts the received variable frequency pattern to vibratory motion.

As a non-limiting example, used solely for purposes of illustration and not limitation, embodiments of the present invention may be used in conjunction with and/or applied to the embodiments disclosed in the U.S. patent application Ser. No. 13/854,220, filed on Apr. 1, 2013, which is assigned to International Business Machines Corporation of Armonk, N.Y., USA, and titled "System And Method Of Dynamically Generating A Frequency Pattern To Realize The Sense Of Touch In A Computing Device", the complete disclosure of which is expressly incorporated herein by reference in its entirety for all purposes.

In accordance with embodiments of the present invention, depending on the location of the accessory, a customer can touch a screen at the point of display of the product to feel a texture of the product if the accessory is part of the screen 106, or the customer can move his/her hand over the accessory 100a or 100b to feel the texture of the apparel (e.g., shirt 125).

Figure 3:
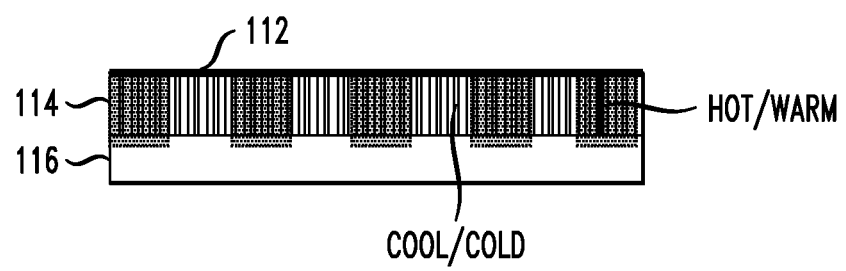
Figure 4:

Referring, for example, to FIGS. 2-4, according to an embodiment of the present invention, the accessory 100a or 100b includes synthetic fibers 114, which can be controlled for attributes, including, but not necessarily limited to, stiffness and temperature, to enable the customer to virtually get a realistic feeling of the texture, temperature, hardness, etc. of an item on the mobile device. The fibers 114 are temperature sensitive to exhibit, for example, hot/cold/warm to a user, are flexible to move in multiple directions, e.g., left, right, up and down to translate a frequency pattern into physical movement, and/or are capable of restoring to their original flexibility and temperature states. As shown, for example, in FIG. 3, for purposes of illustration, fibers 114 that are cold or cool are depicted as unshaded, and fibers that are hot or warm are depicted as shaded. Further, it is to be understood that the accessory 100a or 100b is not necessarily limited to fibers 114.

The malleable material/membrane 112 includes, for example, a planar membrane made of malleable/ductile material, which, according to an embodiment, is also magnetic. Referring to FIGS. 2-4, the membrane 112 covers the fibers 114 positioned underneath the membrane 112. Similar to the fibers 114, the membrane 112 is flexible to move in multiple directions, e.g., left, right, up and down to translate a frequency pattern(s) into physical movement, and/or is capable of restoring to its original flexibility and temperature states. Referring to FIG. 4, the actuator(s) 116 controls the movement of the fibers 114 by inducing an appropriate electric charge(s). The electric charges are induced on the fibers 114 due to the vibration output of the actuator 116. The wave-like vibration produced by the actuator 116 results in the motion and electric charges of the synthetic fibers 114. The electric charges, which repel or attract the membrane 112 having magnetic properties, and the varying heights of the fibers 114 result in the physical wave pattern shown in FIG. 4, enabling a user to feel a texture.

According to an embodiment, an actuator 116 to control the fibers 114 includes, for example, an electro-mechanical motor, is connected to the fibers 114, and is capable of translating a received variable frequency pattern into a physical representation of the feel of a texture of a product/wound by generating a wave-like vibration pattern corresponding to the received variable frequency. The actuator(s) 116 can control the temperature of the fibers 114 at certain locations by altering an electrical resistance based on the portions of the metadata relating to temperature. For example, the actuator 116 can increase an electrical resistance at portions that are to be warmer than other portions (e.g., temperature higher than ambient temperature). According to an embodiment, if optical fibers are used, temperature of the fibers can be modified by controlling modulation of light passing through the fibers. The actuator 116 also controls mechanical movement of the fibers 114. In accordance with an embodiment, the actuator(s) 116 can include an air blower(s) or suction to push or pull the membrane 112 at each or some portions thereof. It is to be understood that a wave-like pattern of the membrane 112 may be a result of one or more air blowers or air suction pushing or pulling the membrane at different portions thereof. According to embodiments of the present invention, one or more actuators can be used to provide different features.

The accessory 100a in the form of the dongle can be plugged into a mobile device 102, for example, a smart phone device, using technology such as a USB port for a wired connection, BLUETOOTH connectivity for a wireless connection, etc. The accessory 100b, which can be incorporated into and/or embedded in a chassis or body 104 of the mobile device 102 can be located at any appropriate location on the mobile device 102, such as, for example, at lower left or lower right corners of a smart phone device.

Figure 6:
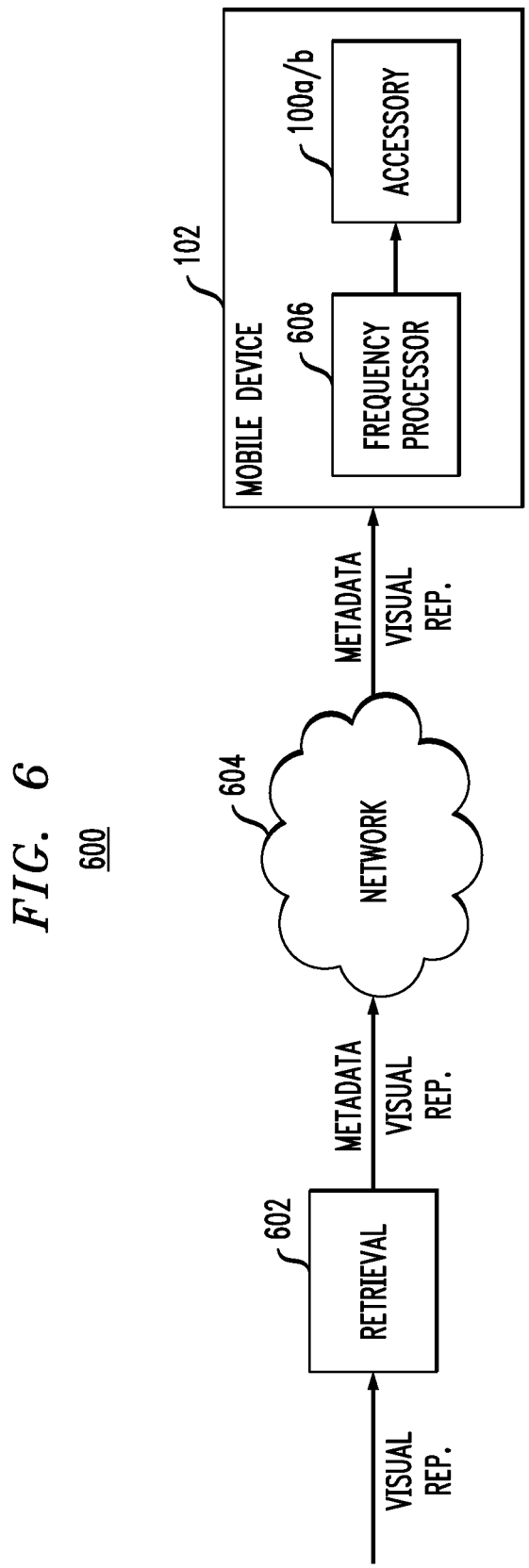
FIG. 6 is a high-level block diagram illustrating a system for providing tactile feedback according to an exemplary embodiment of the invention.

Referring to FIG. 6, a system 600 for providing tactile feedback to a user, according to an embodiment of the present invention, includes a retrieval module 602 which extracts one or more features representing characteristics of the product (e.g., texture, temperature, softness/hardness, stiffness, moisture content, swelling, color, size, etc.) from a visual representation of an item (e.g., a consumer product or medical condition, such as a wound), physically segments the visual representation (e.g. image) into portions, and based on the extracted features, maps a frequency pattern corresponding to each of the segments. The visual representation can be derived from, for example, an online commerce site product offering, or a taken picture of a product or a part of the body of a patient that is uploaded to the retrieval module 602 and sent to a user of the mobile device 102. In an alternative embodiment, a frequency pattern can be generated from an image file associated with the subject item and/or a description of the subject item.

The retrieval module 602 sends the frequency pattern to the mobile device 102 or other computing device as meta data, and sends the visual representation to the mobile device 102. According to an embodiment, the retrieval module 602 is located at a remote server, such as an online application server, accessible via a network.

According to an embodiment of the present invention, the extraction and segmentation is performed using DIP, DIC and/or MRI, and the mapping is performed by a dynamic frequency generator. The mapped variable frequency pattern includes time-varying data values associated with each physical haptic property of the product. The frequency pattern meta data is sent to the mobile device 102 via a network 604, such as a local area network (LAN), wide area network (WAN), cellular network, satellite network or the Internet, and is processed by a frequency processing module 606 which is electrically connected to and/or incorporated into the mobile device 102. According to embodiments, communication between the retrieval module 602 and the mobile device 102 can be via, for example, multimedia messaging and/or based on Wi-Fi, BLUETOOTH, GSM/CDMA, 2G, 3G, 4G, etc. technologies. Based on the frequency pattern received from the frequency processing module, the actuator(s) 116 is able to generate the appropriate wave-like patterns and/or control temperature so that the accessory 100a or 100b provides the necessary tactile feedback when the user interacts with the accessory 100a or 100b. According to an embodiment, the wave-like vibration pattern corresponds to the frequency of each segment so that a user is able to feel the differences in the attributes at each respective portion of the item.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1A, 1B and 2-6 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 7:
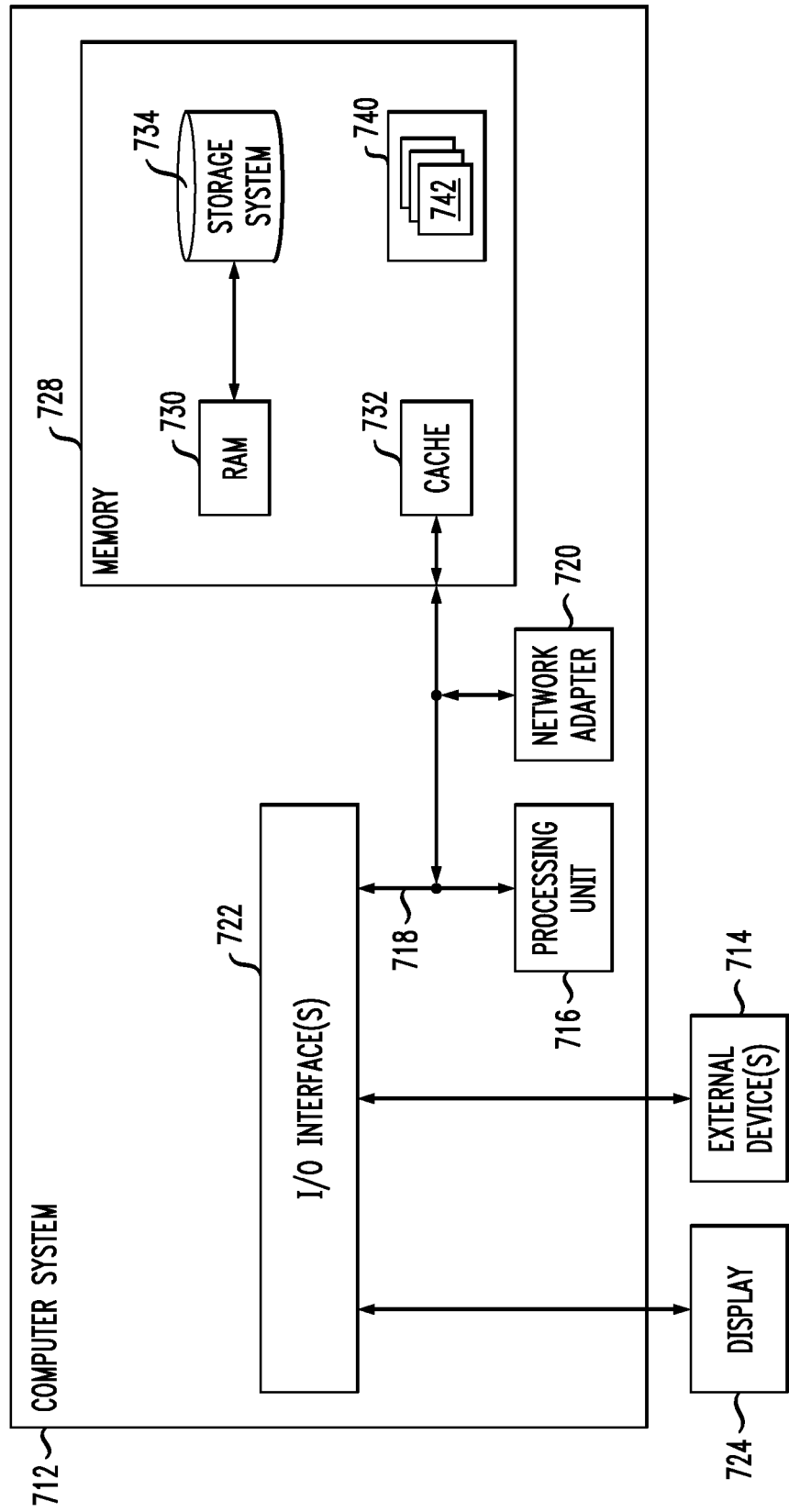
FIG. 7 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/ server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for providing tactile feedback, comprising:
    capturing a visual representation of a physical object having at least one haptic property;
    segmenting the captured visual representation into a plurality of portions;
    generating, at a first computing device, time-varying data associated with at least one haptic property of each of the portions;
    sending, via a network and from the first computing device, the visual representation and the time-varying data to a second computing device including a feedback apparatus electrically connected to the second computing device, wherein the time-varying data is sent to the second computing device as meta data; and
    generating the tactile feedback via the feedback apparatus in response to a pressure on the feedback apparatus applied by a user;
    wherein a haptic property of a first portion of the plurality of portions comprises a first texture and a haptic property of a second portion of the plurality of portions comprises a second texture that is different from the first texture;
    wherein the time-varying data is processed such that the feedback apparatus of the second computing device is configured to present at least the haptic properties of each of the first and second portions of the captured visual representation; and
    wherein the time-varying data varies based at least on differences between the haptic properties of each of the first and second portions.

2. The method of claim 1, wherein a pattern of the tactile feedback is a time-varying function of the time-varying data.

3. The method of claim 1, wherein the feedback apparatus comprises:
    an actuator, wherein the actuator is capable of generating a vibration pattern based on the time-varying data;
    a plurality of fibers on the actuator; and
    a membrane on the plurality of fibers.

4. The method of claim 3, wherein the actuator induces an electric charge on the fibers, and the fibers move based on the induced electric charge.

5. The method of claim 4, wherein the membrane is magnetic, the electric charge one of repels and attracts the membrane, and the membrane changes shape based on the electric charge.

6. The method of claim 3, wherein the actuator controls at least one of stiffness and temperature of the fibers.

7. The method of claim 3, wherein the tactile feedback includes a two-dimensional time-varying pattern of vibration generated by the actuator.

8. The method of claim 3, wherein the plurality of fibers extend vertically from a surface and are arranged on the surface in a side-by-side configuration.

9. The method of claim 8, wherein, when generating the tactile feedback, a first portion of the plurality of fibers is at a first height with respect to the surface and a second portion of the plurality of fibers is at a second height with respect to the surface different from the first height, the first and second heights being controlled by the actuator.

10. The method of claim 8, wherein the plurality of fibers are configured to move in up, down, left and right directions with respect to the surface from which the plurality of fibers extend.

11. The method of claim 8, wherein, when generating the tactile feedback, a first portion of the plurality of fibers is at a first temperature and a second portion of the plurality of fibers is at a second temperature different from the first temperature, the first and second temperatures being controlled by the actuator.

12. The method of claim 1, wherein the feedback apparatus is integrated into a body of the computing device.

13. The method of claim 1, wherein the feedback apparatus is selectively attached to the computing device via a port.

14. The method of claim 1, wherein communication between the first computing device and the second computing device is performed via multimedia messaging.

15. The method of claim 1, wherein generating the time-varying data comprises mapping a frequency pattern corresponding to each of the segmented portions based on at least the haptic properties of each of the first and second portions.

* * * * *